(12) United States Patent
Yang

(10) Patent No.: US 11,323,517 B2
(45) Date of Patent: May 3, 2022

(54) INTERNET OF THINGS CONNECTIVITY AGGREGATOR SYSTEM AND PROCESS

(71) Applicant: TracFone Wireless, inc., Miami, FL (US)

(72) Inventor: Zhong Yang, Miami, FL (US)

(73) Assignee: TRACFONE WIRELESS, INC., Miami, FL (US)

( * ) Notice: Subject to any disclaimer, the term of this patent is extended or adjusted under 35 U.S.C. 154(b) by 45 days.

(21) Appl. No.: 16/398,759

(22) Filed: Apr. 30, 2019

(65) Prior Publication Data

US 2019/0334997 A1  Oct. 31, 2019

Related U.S. Application Data

(60) Provisional application No. 62/664,490, filed on Apr. 30, 2018.

(51) Int. Cl.
| | | |
|---|---|---|
| *H04L 29/08* | (2006.01) | |
| *G06Q 30/04* | (2012.01) | |
| *H04L 12/26* | (2006.01) | |
| *H04L 12/24* | (2006.01) | |
| *H04W 4/24* | (2018.01) | |
| *H04L 67/12* | (2022.01) | |
| *H04L 43/0811* | (2022.01) | |
| *H04L 41/0869* | (2022.01) | |
| *H04L 67/53* | (2022.01) | |

(52) U.S. Cl.
CPC .............. *H04L 67/12* (2013.01); *G06Q 30/04* (2013.01); *H04L 41/0869* (2013.01); *H04L 43/0811* (2013.01); *H04W 4/24* (2013.01); *H04L 67/20* (2013.01)

(58) Field of Classification Search
CPC ...... H04J 11/0079; H04L 67/12; H04L 65/80; H04L 63/0876; H04L 63/102; H04L 43/0811; H04L 41/0869; H04L 67/20; H04L 41/04; H04L 12/1407; H04L 12/14; G06F 1/182; H04W 4/00; H04W 72/12; H04W 8/18; H04W 24/04; H04W 24/10; H04W 4/70; H04W 52/0251; H04W 12/06; H04W 4/50; H04W 4/60; H04W 76/15; H04W 88/06; H04W 8/04; H04W 8/186; H04W 4/24; Y04S 40/18; H04M 15/66; H04M 15/68; H04M 15/00; H04M 15/8033; G06Q 30/04
See application file for complete search history.

(56) References Cited

U.S. PATENT DOCUMENTS

| | | | |
|---|---|---|---|
| 2004/0123129 A1* | 6/2004 | Ginter | .................... G06Q 30/06 713/193 |
| 2008/0165789 A1* | 7/2008 | Ansari | ............. G08B 13/19656 370/401 |

(Continued)

*Primary Examiner* — Kevin T Bates
*Assistant Examiner* — Ranjan Pant

(57) ABSTRACT

An internet of things aggregator system includes a management system. The management system being configured to connect to and exchange data with at least one wireless network, at least one Internet of things device, a functional system, and a third party enterprise. The management system is configured to implement a certification system, a connectivity system, a coding system, a billing system, and a unified policy control system. The disclosure is also directed to an internet of things aggregator process.

20 Claims, 9 Drawing Sheets

(56) References Cited

U.S. PATENT DOCUMENTS

| | | | |
|---|---|---|---|
| 2016/0066186 A1* | 3/2016 | Kim | H04M 15/60 |
| | | | 455/406 |
| 2017/0026817 A1* | 1/2017 | Levine | H04M 15/8356 |
| 2018/0376534 A1* | 12/2018 | Mustafic | H04W 92/02 |
| 2019/0150134 A1* | 5/2019 | Kakinada | H04L 67/125 |
| | | | 370/330 |
| 2019/0220264 A1* | 7/2019 | Yoon | H04L 69/18 |
| 2020/0021955 A1* | 1/2020 | Govindassamy | H04L 12/14 |

* cited by examiner

INTERNET OF THINGS CONNECTIVITY AGGREGATOR SYSTEM AND PROCESS

CROSS-REFERENCE TO RELATED APPLICATIONS

This application claims the benefit from U.S. Provisional Application No. 62/664,490 filed on Apr. 30, 2018, which is hereby incorporated by reference in its entirety for all purposes as if fully set forth herein.

BACKGROUND OF THE DISCLOSURE

1. Field of the Disclosure

This disclosure relates generally to an internet of things connectivity aggregator system. This disclosure also relates generally to an internet of things connectivity aggregator process.

2. Related Art

The Internet of things (IoT) is a network of objects embedded with electronics, software, sensors, actuators, and network connectivity which enable these objects to connect and exchange data. The IoT allows objects to be sensed or controlled remotely across a network infrastructure, which provides direct integration of the physical world into computer-based systems resulting in improved efficiency, accuracy, and economic benefit in addition to reduced human intervention.

However, implementation of the IoT objects on a large scale is complicated by the number of wireless carriers that provide wireless service to the IoT objects. In this regard, a company desiring to implement IoT must certify devices with each of the multiple wireless carriers, must establish connectivity with each of the multiple wireless carriers, must adapt software for the devices for each of the multiple wireless carriers, must manage administrative issues with the multiple wireless carriers including billing, and must address the different rules and constraints for each of the multiple wireless carriers.

Accordingly, there is a need for a system and process to reduce the complexity of large-scale IoT implementations.

SUMMARY OF THE DISCLOSURE

The foregoing needs are met, to a great extent, by the disclosure, with an internet of things connectivity aggregator system and process.

In one aspect, an internet of things aggregator system includes a management system configured to connect to and exchange data with at least one wireless network, at least one Internet of things device, a functional system, and a third party enterprise; the management system configured to implement a certification system, the certification system facilitates integration of the at least one Internet of things device to their ecosystem, and the certification system ensures the at least one Internet of things device is properly integrated and working; the management system further configured to implement a connectivity system, the connectivity system ensures that the at least one Internet of things device is connecting to the at least one wireless network and the at least one Internet of things device is properly exchanging data across the at least one wireless network as well as exchanging data with the third party enterprise; the management system further configured to implement a coding system, the coding system ensures proper API coding for implementation of the at least one Internet of things device in the at least one wireless network and in conjunction with the third party enterprise, and the coding system ensures proper API coding of at least subroutine definitions, protocols, tools, and associated methods of communication between various software components; the management system further configured to implement a billing system, the billing system ensures proper billing of wireless services of the at least one Internet of things device in the at least one wireless network as well as the billing associated with operation of the functional system; and the management system further configured to implement a unified policy control system, the unified policy control system comprises a policy stored in a database, and the unified policy control system applies the policy in interactions between the third party enterprise, the functional system, and/or the at least one wireless network, wherein the data includes at least data, information, instructions.

In a further aspect, an internet of things aggregator process includes implementing a management system configured to connect to and exchange data with at least one wireless network, at least one Internet of things device, a functional system, and a third party enterprise; implementing a certification process with the management system, the certification process facilitates integration of the at least one Internet of things device to their ecosystem, and the certification process ensures the at least one Internet of things device is properly integrated and working; implementing a connectivity process with the management system, the connectivity process ensures that the at least one Internet of things device is connecting to the at least one wireless network and the at least one Internet of things device is properly exchanging data across the at least one wireless network as well as exchanging data with the third party enterprise; implementing a coding process with the management system, the coding process ensures proper API coding for implementation of the at least one Internet of things device in the at least one wireless network and in conjunction with the third party enterprise, and the coding process ensures proper API coding of at least subroutine definitions, protocols, tools, and associated methods of communication between various software components; implementing a billing process with the management system, the billing process ensures proper billing of wireless services of the at least one Internet of things device in the at least one wireless network as well as the billing associated with operation of the functional system; and implementing a unified policy control process with the management system, the unified policy control process comprises a policy stored in a database, and the unified policy control process applies the policy in interactions between the third party enterprise, the functional system, and/or the at least one wireless network, wherein the data includes at least data, information, instructions.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
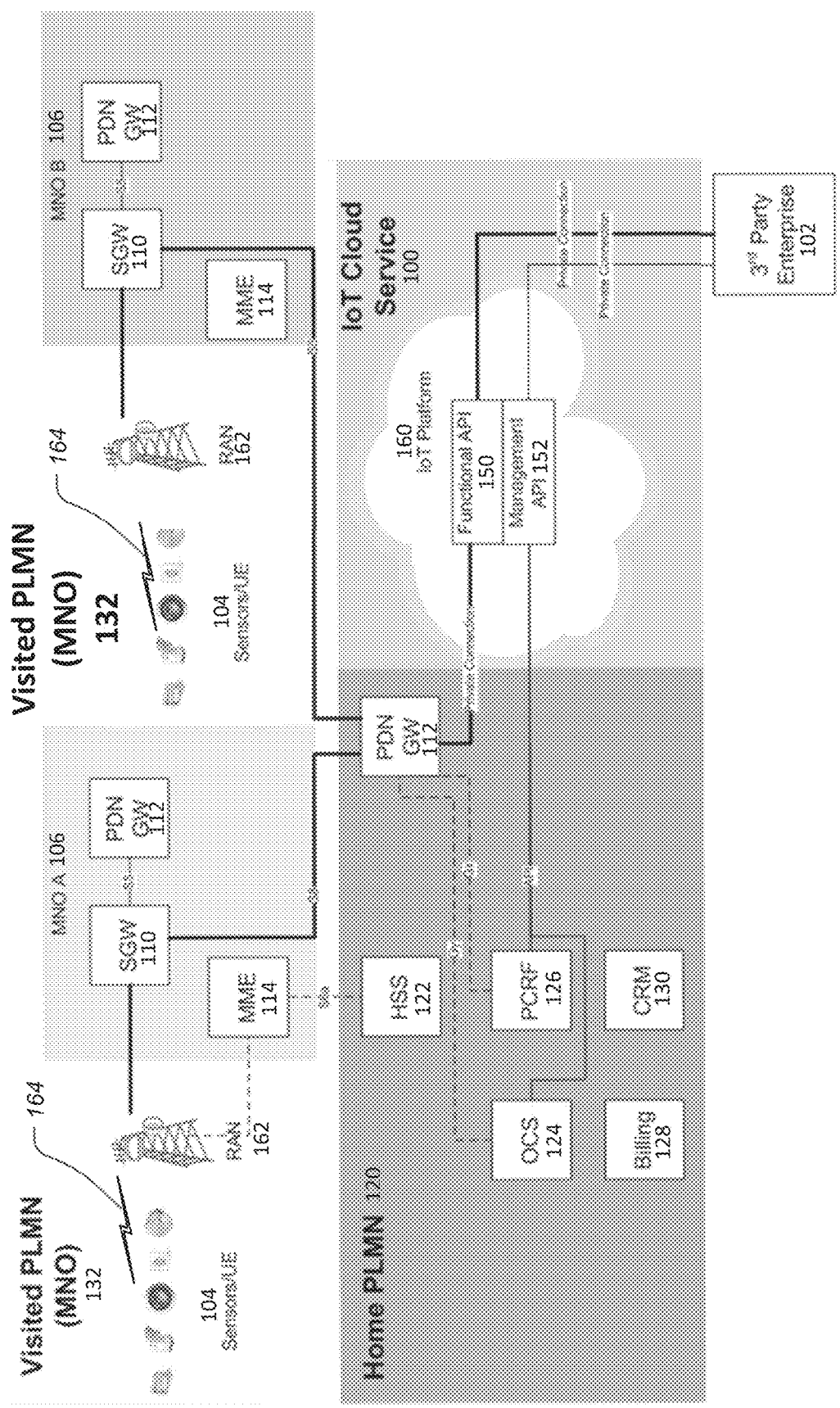
FIG. 1 illustrates an exemplary IoT system with associated components, in accordance with aspects of the disclosure.

Reference in this specification to an IoT device is intended to encompass any compatible mobile technology computing device that connects to a wireless communication network. The IoT device may be implemented as any physical device embedded with electronics, software, sensors, actuators, and network connectivity which enable these objects to connect and exchange data, information, instructions, and the like. The IoT device may be implemented in a smart home, a wearable device, a smart city implementation, a smart grid implementation, an industrial implementation, a connected car implementation, a connected health related implementation, a smart retail implementation, a smart supply chain implementation, a smart farming implementation, and the like. The IoT device may be configured to sense, control, be controlled, and the like remotely across a wireless network infrastructure, creating opportunities for more direct integration of the physical world into computer-based systems, and resulting in improved efficiency, accuracy and economic benefit in addition to reduced human intervention.

The IoT device may connect to a "wireless network" or "network" and is intended to encompass any type of wireless network to obtain wireless services for the use of the IoT device, such as the Global System for Mobile Communication (GSM) network, Code-Division Multiple Access (CDMA) network, GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, a communication channel as defined herein, or the like, and/or a combination of two or more thereof, that may utilize the teachings of the disclosure to allow the IoT device to connect to a wireless network to exchange data.

Certain companies that provide wireless services, can be wireless carriers or Mobile Network Operators (MNOs) that maintain, operate, and control their own wireless networks and typically have control of their own frequency spectrum. An MNO relies heavily on backend systems to address any provisional, billing, security, and data issues that might threaten the health of their networks.

A Mobile Virtual Network Operator (MVNO) is a mobile operator that typically does not own its own frequency spectrum and typically does not have its own network infrastructure. Instead, MVNOs have business arrangements and contracts with third party wireless carriers (MNOs) to purchase usage of their networks (e.g., minutes of voice calls, volume of data transfer, number of SMS, service days, etc.) that the MVNOs in turn sell to their own customers. The disclosed internet of things connectivity aggregator system and process may be utilized in relation to a MNO or a MVNO. However, implementations of the disclosed internet of things connectivity aggregator system and process may have numerous benefits when implemented by a MVNO. In one aspect, implementations of the disclosed internet of things connectivity aggregator system and process may have numerous benefits when implemented by a MVNO due to the multiple wireless carriers and/or multiple networks implemented by a MVNO. However, the disclosed internet of things connectivity aggregator system and process may also be implemented by a MNO.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

FIG. 1 illustrates an exemplary IoT system with associated system components, in accordance with aspects of the disclosure.

In particular, FIG. 1 shows an IoT system that may include and/or connect to a plurality of wireless networks 106. In one aspect, each of the plurality of wireless networks 106 may be implemented in wireless networks implemented at least in part by mobile network operators (MNOs). In one aspect, each of the plurality of wireless networks 106 may be provisioned and overseen by a mobile virtual network operator (MVNO). As shown in FIG. 1, there are two wireless networks, MNO A 106 and MNO B 106. However, it is contemplated that any number of MNOs may be utilized in the IoT system. Each of the plurality of wireless networks 106 may connect to a respective plurality of IoT devices 104. Data, information, instructions, and the like are exchanged between the plurality of wireless networks 106 and the plurality of IoT devices 104 over a communication channel 164 as defined herein. For brevity, the data, information, instructions, and the like exchanged between the plurality of wireless networks 106 and the plurality of IoT devices 104 will be referred to as data hereinafter.

A portion of the data exchanged between the plurality of wireless networks 106 and the plurality of IoT devices 104 may be transmitted to an IoT cloud service 100 that may include an IoT platform 160. Moreover, a portion of the data exchanged between the plurality of wireless networks 106 and the plurality of IoT devices 104 may be received from the IoT cloud service 100 and/or the IoT platform 160.

Finally, a portion of the data exchanged between the plurality of wireless networks 106 and the plurality of IoT devices 104 may be transmitted from the IoT cloud service 100 and/or the IoT platform 160 to a third party enterprise 102. Moreover, a portion of the data exchanged between the plurality of wireless networks 106 and the plurality of IoT devices 104 may be transmitted to the IoT cloud service 100 and/or the IoT platform 160 from the third party enterprise 102. The third party enterprise 102 may be an entity that desires to implement the functionality of the IoT devices 104. In particular, the third party enterprise 102 may an entity providing Internet of things functionality for a smart home, a wearable device, a smart city implementation, a smart grid implementation, an industrial implementation, a connected car implementation, a connected health related implementation, a smart retail implementation, a smart supply chain implementation, a smart farming implementation, and the like. In a particular aspect, all data exchanged between the plurality of IoT devices 104 and the third party enterprise 102 may be transmitted through the IoT cloud service 100 and/or the IoT platform 160.

The IoT cloud service 100 of the disclosure as described in greater detail below provides increased efficiency, connectivity, control, proficiency, and the like. In one aspect, the IoT cloud service 100 of the disclosure as described in greater detail below provides increased efficiency, connectivity, control, proficiency, and the like over multiple wireless carriers and/or multiple wireless networks. The IoT cloud service 100 may be implemented by one or more servers, processors, databases, and the like. In one aspect, the IoT cloud service 100 may include a functional application programming interface (API) system 150. In one aspect, the IoT cloud service 100 may include a management application programming interface (API) system 152. In one aspect, the IoT cloud service 100 may include the management application programming interface (API) system 152 and the functional application programming interface (API) system 150.

In some aspects, the APIs of the functional API system 150 and the management API system 152 may include a set of subroutine definitions, protocols, tools, and the like. These may include a set of clearly defined methods of communication between various software components. The APIs may be for a web-based system, operating system, database system, computer hardware, software library, or the like. In some aspects, the APIs may include a specification that can take many forms, but may include specifications for routines, data structures, object classes, variables, or remote calls. The APIs may be implemented by POSIX, Windows API, ASPI, and the like.

The functional API system 150 may implement or connect to an on-demand cloud computing platform. For example, the functional API system 150 may implement Amazon Web Services (AWS). AWS is a subsidiary of Amazon.com that provides on-demand cloud computing platforms to individuals, companies, and governments, on a paid subscription basis. The functional API system 150 may allow subscribers to have at their disposal a full-fledged virtual cluster of computers, available all the time, through the internet. The functional API system 150 may implement virtual computers that may include a number of the attributes of a real computer including a central processing unit (CPU), graphics processing unit (GPU), Random-access memory (RAM), hard-disk storage, solid-state drive (SSD) storage, and/or the like. The functional API system 150 may include a choice of operating systems and networking. The functional API system 150 may have pre-loaded application software such as web servers, databases, CRM, etc. The functional API system 150 may also virtualize its console I/O (keyboard, display, and mouse), allowing subscribers to connect to their system using a browser. The browser acts as a window into the virtual computer, letting subscribers log-in, configure, and use their virtual systems just as they would a real physical computer.

The management API system 152 may aggregate, process, control, and the like multiple functions between the third party enterprise 102, the IOT device 104 and the functional API system 150. In this regard, certain aspects of the management API system 152 may implement certification functions, connectivity functions, API coding functions, billing functions, unified policy control functions, and the like.

Each of the plurality of wireless networks 106 may include a radio access network (RAN) 162. The RAN 162 may be implemented as part of a mobile telecommunication system of the wireless network 106. The RAN 162 may implement a radio access technology. The RAN 162 may reside between the plurality of IoT devices 104 and the IoT cloud service 100 and provide a connection with a core network (CN).

Each of the plurality of wireless networks 106 may include a Mobility Management Entity (MME) 114. The MME 114 may function as a key control-node. The MME 114 may be responsible for idle mode of the IoT device 104 as well as paging and tagging procedures including retransmissions. The MME 114 may be involved in the bearer activation/deactivation process and may also responsible for choosing a Signaling Gateway (SGW) 110 for the IoT device 104 at the initial attach and at a time of intra-LTE handover involving Core Network (CN) node relocation. The MME 114 may be responsible for authenticating the IoT device 104 by interacting with a home subscriber server (HSS) 122. Non Access Stratum (NAS) signaling may terminate at the MME 114 and may also be responsible for generation and allocation of temporary identities to the IoT device 104. The MME 114 may check the authorization of the IoT device 104 to camp on the service provider's Public Land Mobile Network (PLMN) and may enforce roaming restrictions on the IoT device 104. The MME 114 may be a termination point in the wireless network 106 for ciphering/integrity protection for NAS signaling and may handle the security key management. The MME 114 may also provide a control plane function for mobility between LTE and 2G/3G access networks with an S3 interface terminating at the MME 114 from the Serving GPRS Support Node (SGSN). The MME 114 may also terminate an S6a interface towards the home HSS 122 for roaming IoT devices 104.

The SGW 110 may be implemented as a network component responsible for transferring signaling messages (i.e. information related to call establishment, billing, location, short messages, address conversion, and other services) between Common Channel Signaling (CCS) nodes that communicate using different protocols and transports.

Each of the plurality of wireless networks 106 may include the home subscriber server (HSS) 122, or user profile server function (UPSF). The HSS 122 may be a master user database that supports IP Multimedia Core Network Subsystem (IMS) network entities. It may contain the subscription-related information (subscriber profiles), performs authentication and authorization of the user, and can provide information about the subscriber's location and IP information. In other aspects, the wireless networks 106 may be implemented without the home subscriber server (HSS) 122.

Each of the plurality of wireless networks 106 may include a public data network (PDN) gateway (PDN GW) 112. The PDN GW 112 may contain devices such as protocol translators, impedance matching devices, rate converters, fault isolators, or signal translators as necessary to provide system interoperability. The PDN GW 112 may also require the establishment of mutually acceptable administrative procedures between networks.

The PDN may be a circuit-switched or packet-switched network that can transmit data in digital form. The PDN may provide any of X.25, frame relay, cell relay (ATM), or the like services. Access to a PDN generally includes a guaranteed bandwidth, known as the committed information rate (CIR).

The wireless network 106 may include an S5/S8 interface that may be used within the Evolved Packet Core (EPC) for LTE. The S5 interface may provide user plane tunneling and tunnel management between a serving GW and PDN GW 112. It may be used for Serving GW relocation due to IoT device 104 mobility and if the serving GW needs to connect to a non-collocated PDN GW 112 for the required PDN connectivity.

The wireless network 106 may further include an Online Charging System (OCS) 124. The OCS 124 may be a system allowing a communications service provider to charge their customers, in real time, based on service usage. The OCS 124 may communicate with a billing component 128.

The wireless network 106 may further include a Policy and Charging Rules Function (PCRF) 126. The PCRF 126 may be a software node designated in real-time to determine policy rules in a multimedia network. In some aspects, the PCRF 126 may be a policy tool. The PCRF 126 may be a component that operates at the network core and accesses subscriber databases and other specialized functions, such as a charging system, in a centralized manner. The PCRF 126 may be part of the network architecture that aggregates information to and from the wireless network 106, operational support systems, and other sources (such as portals) in real time, supporting the creation of rules and then automatically making policy decisions for each subscriber active on the network. The PCRF 126 may communicate with a billing component 128.

The Customer Relationship Management (CRM) 130 may be an integrated management information system that is used to schedule, plan, and control the activities for the wireless network 106. The CRM 130 may include hardware, software, and networking tools to improve customer tracking and communication.

In some aspects, the wireless network 106 may include an S8 interface. The S8 interface may provide an inter-PLMN reference point providing user and control plane between the Serving GW in the VPLMN 132 and the PDN GW 112 and the HPLMN 120. S8 is the inter PLMN variant of S5. In some aspects, the wireless network 106 may include Gx signaling. The Gx signaling may provide an on-line policy interface between the GGSN and the charging rules function (CRF). It may be used for provisioning service data flow based on charging rules. The Gx signaling may utilize the diameter protocol. In some aspects, the wireless network 106 may include Gy signaling. The Gy signaling may be an on-line charging interface between the GGSN and the online charging system (OCS) 124. The Gy signaling may utilize the diameter protocol.

In alternative or additional aspects, the wireless network 106 may include a base transceiver station (BTS), a base station controller (BSC), and a mobile switching center (MSC) overseen by a network operator. Other types of wireless networks utilizing a communication channel as defined herein are contemplated as well. The wireless network 106 may communicate with the IoT device 104 over a communication channel 164 as defined herein.

Figure 2:
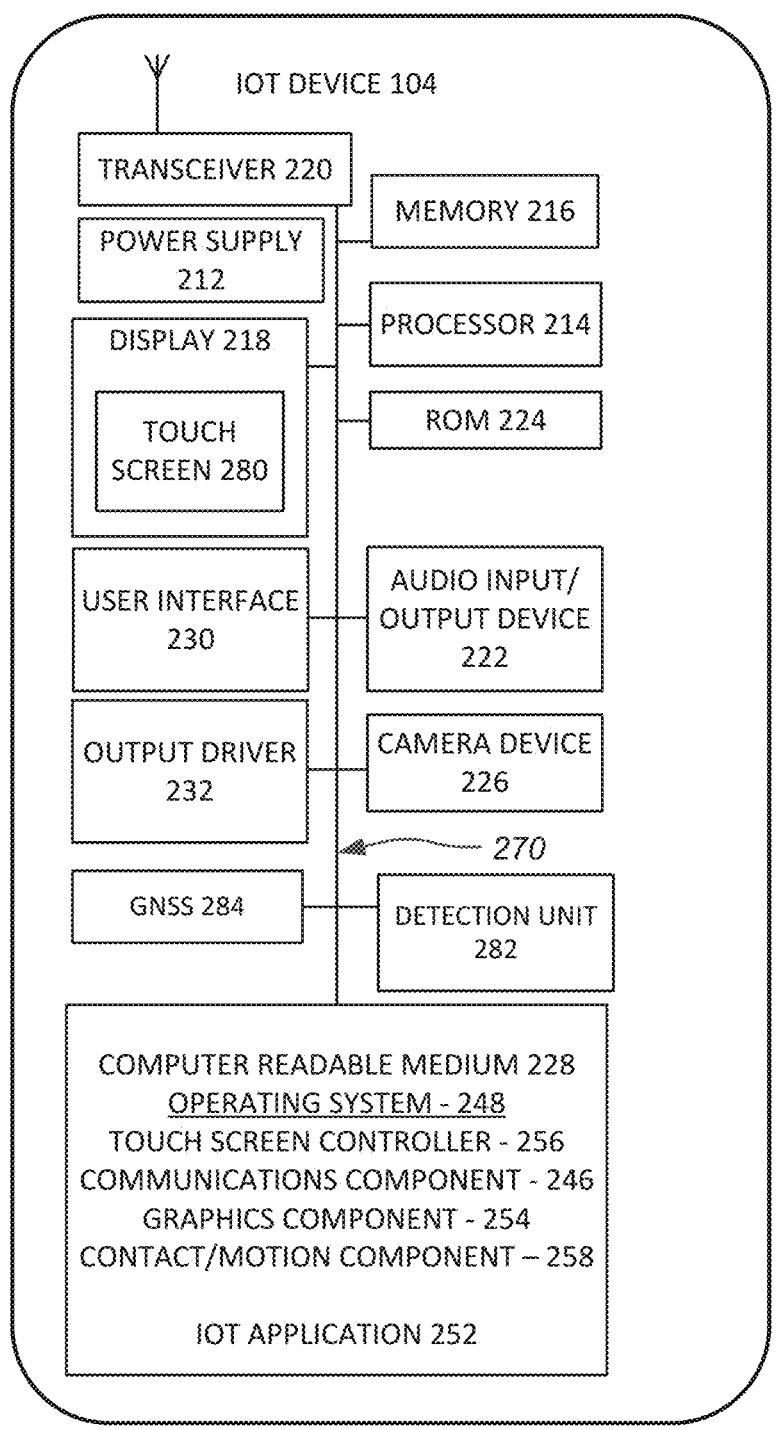
FIG. 2 illustrates details of an exemplary IoT device in accordance with aspects of the disclosure.

FIG. 2 shows the details of an exemplary IoT device in accordance with aspects of the disclosure.

The IoT device 104 may include a processor 214, a memory 216, and the like. The processor 214 may be a central processing unit, chipset, microprocessor, dedicated hardware, or the like configured to execute instructions including instructions related to software programs.

The IoT device 104 may further include in the memory 216 or separate from the memory 216, a computer readable memory 228, an operating system 248, a communication component 246, a contact/motion component 258, a touch-screen controller 256, a graphics component 254, and the like. The operating system 248 together with the various components providing software functionality for each of the components of the IoT device 104. The IoT device 104 may further include a read-only memory 224 (ROM) and a power supply 212 such as a battery or a wired connection to a power source.

The memory 216 may include a high-speed random-access memory. Also, the memory 216 may be a non-volatile memory, such as magnetic fixed disk storage, flash memory or the like. The various components of the IoT device 104 may be connected through various communication lines including a data bus 270.

Additionally, the IoT device 104 may include an audio input/output device 222. The audio input/output device 222 may include speakers, speaker outputs, and the like, providing sound output; and may include microphones, microphone inputs, and the like, for receiving sound inputs. The audio input/output device 222 may include an analog to digital converter and a digital to audio converter for audio input and output functions respectively.

The IoT device 104 may include a transceiver 220 and the like. The IoT device 104 may provide radio and signal processing as needed to access the wireless network 106 for services over a communication channel 164 as defined herein. The processor 214 and the transceiver 220 may be configured to process instruction functions, data transfer, and the like and provide other services. In one aspect, IoT device 104 may be configured to communicate over the wireless network 106 utilizing encryption; and the IoT cloud service 100 may be configured for decryption of data received over the wireless network 106. The processor 214 may provide the encryption and decryption functionality. In one aspect, the encryption may include a process of encoding a message, information, the data, and/or the like in such a way that only authorized parties can access it and those who are not authorized cannot. In one aspect, the encryption may include an encryption scheme, the intended information or message, referred to as plaintext, is encrypted using an encryption algorithm, which may be a cipher, generating ciphertext that can be read only if decrypted. In one aspect, the encryption scheme may use a pseudo-random encryption key generated by an algorithm. In symmetric-key schemes, the encryption and decryption keys may be the same. Communicating parties must have the same key in order to achieve secure communication. In one aspect, the encryption scheme may be a public-key encryption scheme where the encryption key is published for anyone to use and encrypt messages. However, only the receiving party has access to the decryption key that enables messages to be read.

In some aspects, the IoT device 104 may include a display 218, a user interface 230, and the like. The display 218 may be a liquid crystal display having a backlight to illuminate the various color liquid crystals to provide a colorful display. The user interface 230 may be any type of physical input having one or more buttons, switches, and the like and/or may be implemented as a touchscreen 280.

The touchscreen 280 of the disclosure may be implemented in the display 218 and may detect a presence and location of a touch of a user within the display area. For example, touching the display 218 of the IoT device 104 with a finger or hand. The touchscreen 280 may also sense other passive objects, such as a stylus.

In operation, the display 218 may display various objects associated with applications for execution by the processor 214. In this regard, a user may touch the display 218, and in particular the touchscreen 280, to interact with the objects. For example touching an object may execute an application in the processor 214 associated with the object that is stored in memory 216. Additionally or alternatively, touching an object may open a menu of options to be selected by the user. The display 218 may include a plurality of the objects for the user to interact with. Moreover the display 218 may include a plurality of screens. The display 218 showing one screen at a time. The user may interact with the display 218 to move a screen into view on the display 218. Various objects may be located in the each of the screens.

The touchscreen 280 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The IoT device 104 may include a camera device 226. The camera device 226 can include one or more cameras to provide visual input. The camera device 226 can also capture video in combination with audio from a microphone of the audio input/output device 222. The camera device 226 may include a charge coupled device (CCD), CMOS image sensors, Back Side Illuminated CMOS, or the like. Images captured by the camera device 226 may be converted and stored in various formats including a JPEG file format, RAW feature format such as the Android (operating system) 5.0 Lollipop, and the like.

The IoT device 104 may include a detection unit 282. The detection unit 282 may include or connect to a number of sensors to detect a physical quantity. The detection unit 282 may be implemented by any one or more of accelerometers, gyroscopes, altitude sensors, temperature sensor, proximity sensor, IR sensor (infrared sensor), pressure sensor, light sensor, ultrasonic sensor, smoke, gas and alcohol sensor, touch sensor, color sensor, humidity sensor, tilt sensor, flow and level sensor, and/or the like. The detection unit 282 may further include analog-to-digital converters, filters, and the like to process the signals associated with any of the sensors.

The IoT device 104 may include an output driver device 232. The output driver device 232 may be configured to provide a drive signal to control, initiate, and the like a component associated with the IoT device 104.

The computer readable memory 228 may be configured to store an IoT control application 252. For the purposes of this disclosure, the computer readable memory 228 stores computer data, which may include computer program code that may be executable by the processor 214 of the IoT device 104 in machine readable form. By way of example, and not limitation, the computer readable memory 228 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable memory 228 or machine readable medium, which may be incorporated into a computer program product.

According to another aspect of the disclosure, the IoT device 104 may estimate the location of the IoT device 104 based, at least in part, on a global navigation satellite system (GNSS 284). In another aspect, the wireless network 106 may implement location determination based on a specific cell in which the IoT device 104 connects. In yet another aspect, the wireless network 106 may obtain location determination based on triangulation with respect to a plurality of cells in which the IoT device 104 receives signals.

Figure 3:
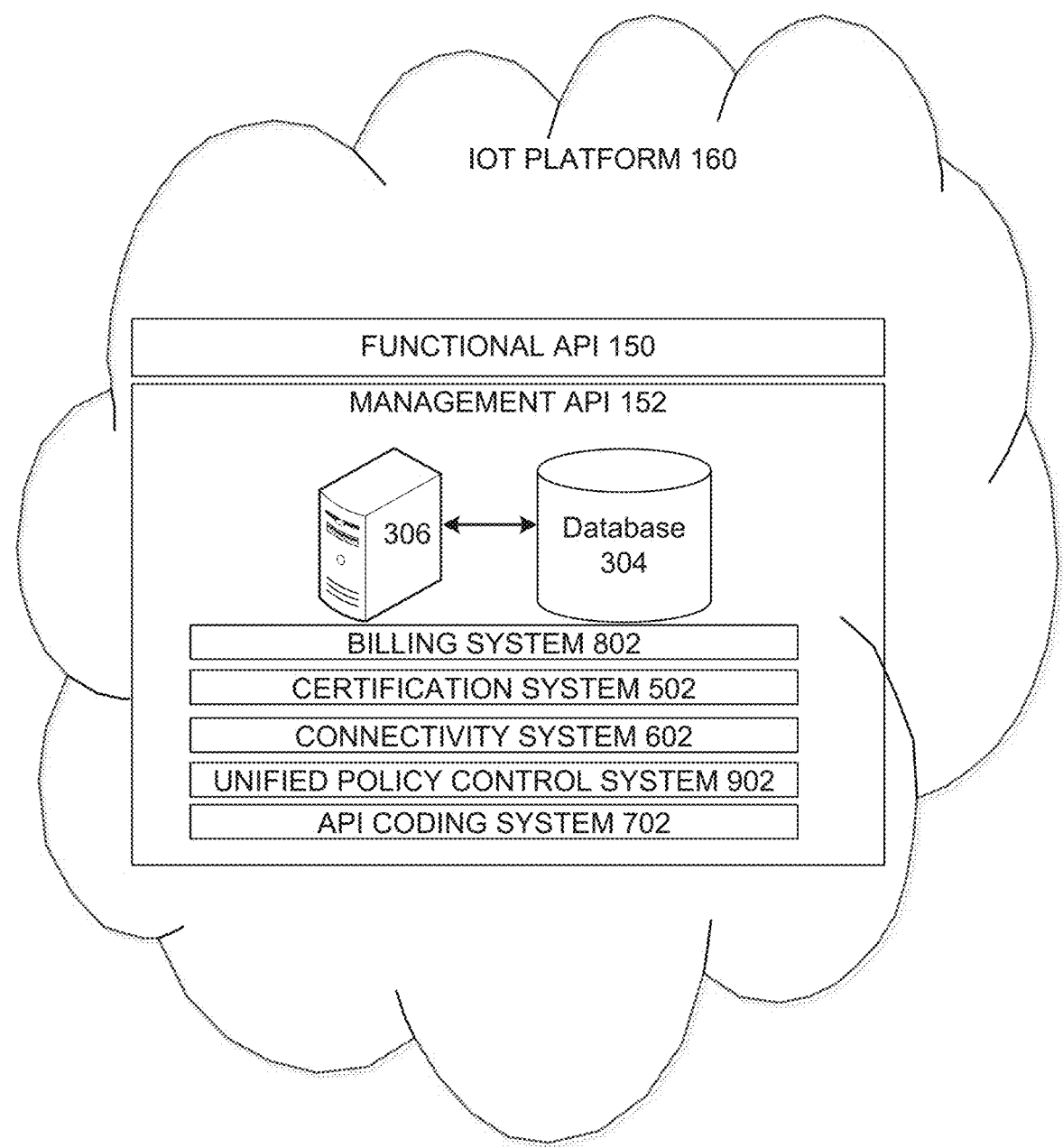
FIG. 3 illustrates details of an exemplary IoT platform in accordance with aspects of the disclosure.

FIG. 3 illustrates details of an exemplary IoT platform in accordance with aspects of the disclosure.

In particular, FIG. 3 illustrates the IoT platform 160 together with details of the management API system 152. The management API system 152 may include, connect, implement, and the like a certification system 502, a connectivity system 602, an API coding system 702, a billing system 802, and a unified policy control system 902.

In some aspects of the disclosure, one or more of the management API system 152, the certification system 502, the connectivity system 602, the API coding system 702, the billing system 802, and the unified policy control system 902 may include a web portal. The web portal may be a specially designed website that brings information from diverse sources. In some aspects, each information source gets a dedicated area on the page for displaying information (a portlet). In some aspects, the portal may include mashups and intranet "dashboards." The portal may use an application programming interface (API). The portal may provide a way for enterprises and organizations with access control, modification, procedures, and the like for multiple applications and databases. The features available may be restricted to an authorized and authenticated user (employee, member).

The certification system 502 may be implemented by the management API system 152 to ensure certification of the IoT devices 104 within the wireless network 106. The connectivity system 602 may be implemented by the management API system 152 to ensure connectivity between the IoT devices 104, the wireless network 106, and the third party enterprise 102. The API coding system 702 may be implemented by the management API system 152 to ensure proper API coding for implementation of the IoT devices 104 in the wireless network 106 and in conjunction with the third party enterprise 102. The billing system 802 may be implemented by the management API system 152 to ensure proper billing of the wireless services of the IoT devices 104 in the wireless network 106 as well as the billing associated with operation of the functional API system 150. The unified policy control system 902 may be implemented by the management API system 152 to ensure proper policy and control of the IoT devices 104 in the wireless network 106.

In various aspects, the management API system 152 may include a processor 306. The processor 306 may be implemented as a PC, CPU, server, and the like. The processor 306 may interact with, connect to, and support the certification system 502, the connectivity system 602, the API coding system 702, the billing system 802, and the unified policy control system 902.

In various aspects, the management API system 152 may include a database 304. The database 304 may include digital storage for implementation of the management API system 152. The database 304 may also provide storage for the certification system 502, the connectivity system 602, the API coding system 702, the billing system 802, and the unified policy control system 902. In one aspect, the database 304 may utilize and implement blockchain technology. In this regard, the database 304 may take the received data as a list of records, that may be defined as blocks. In particular, each of the blocks of the data may be linked using cryptography. Each block may contain a cryptographic hash of the previous block, a timestamp, and the data. The blockchain may be managed by the database 304 adhering to a protocol for inter-node communication and validation of new blocks. In some aspects, the resulting blockchain of the data may form a blockchain ledger that may not be easily modified, changed, and the like to ensure a higher level of security and data confidence. In one aspect, the block chain may be implemented as a public blockchain, a private blockchain, a consortium blockchain, and/or the like.

In one or more aspects, the management API system 152 and/or the functional API system 150 may be configured to run commands for the IoT devices 104 on Windows, macOS, and Linux. These commands may allow the creation and management of the IoT devices 104, certificates, rules, and policies. In one or more aspects, the management API system 152 and/or the functional API system 150 may be configured to build IoT applications for the IoT devices 104 using HTTP or HTTPS requests. These API actions allow the program creation and management of the IoT devices 104, certificates, rules, and policies. In one or more aspects, the management API system 152 and/or the functional API system 150 may be configured to build IoT applications using language-specific APIs. The associated SDKs may wrap the HTTP/HTTPS API and allow programming in any of the supported languages. In one or more aspects, the management API system 152 and/or the functional API system 150 may be configured to build applications that run on the IoT devices 104 that send messages to and receive messages from the management API system 152, the functional API system 150, and/or the IoT devices 104.

Figure 4:
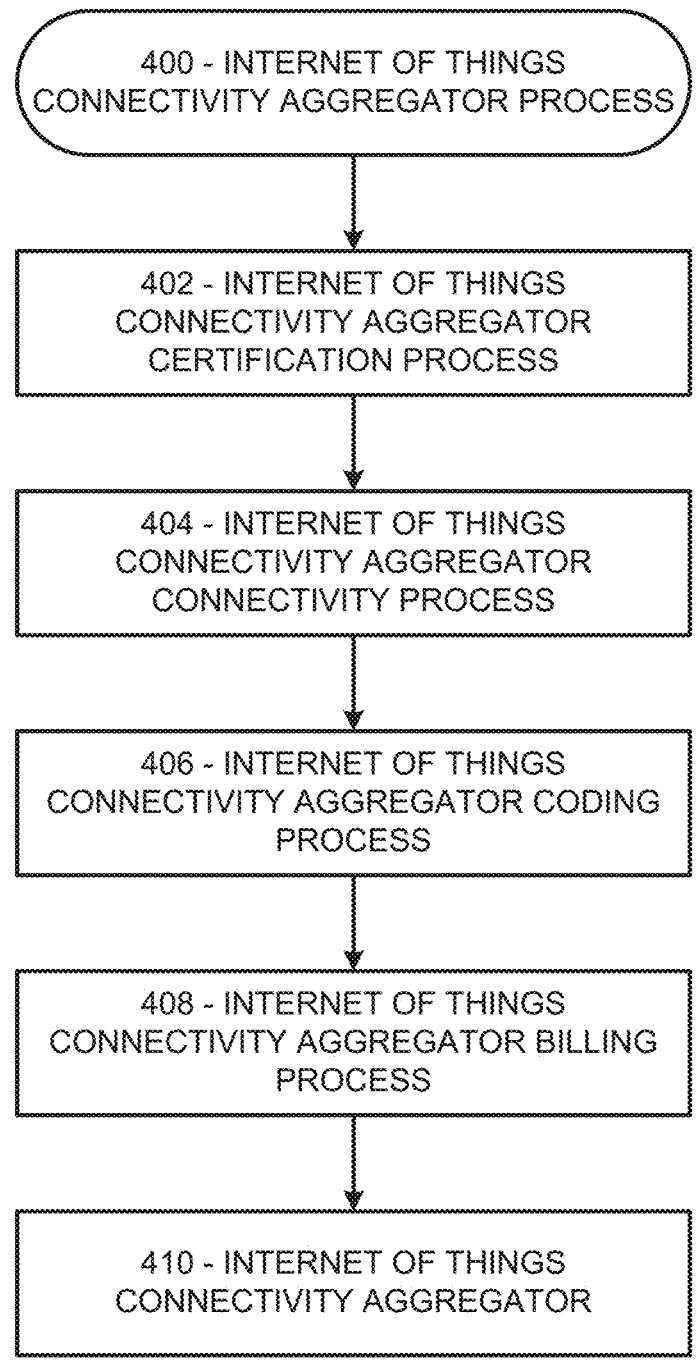
FIG. 4 illustrates a process of operating an IoT aggregator system in accordance with aspects of the disclosure.

FIG. 4 illustrates a process of operating an IoT aggregator system in accordance with aspects of the disclosure.

In particular, FIG. 4 illustrates an internet of things connectivity aggregator process 400. The internet of things connectivity aggregator process 400 may be implemented at least in part by the IoT platform 160, the management API system 152, and/or the like.

In box 402, the internet of things connectivity aggregator process 400 may implement a certification process. In particular, the certification process may be implemented by the management API system 152 to ensure certification of the IoT devices 104 within the wireless network 106. In particular, the certification process may facilitate integration of the IoT devices 104 to their ecosystem. In some aspects, the certification process may ensure the IoT devices 104 are properly integrated (interfaces, data exchange, and logic) and are working with the IoT platform 160. In some aspects, the certification process may be implemented by the management API system 152 to ensure certification of the IoT devices 104 across multiple wireless carriers and/or multiple wireless networks 106 to facilitate integration of the IoT devices 104 to their ecosystem and to ensure proper integration with the multiple wireless carriers and/or the multiple wireless networks 106 with the with the IoT platform 160.

In box 404, the internet of things connectivity aggregator process 400 may implement a connectivity process. The connectivity process may be implemented by the management API system 152 to ensure connectivity between the IoT devices 104, the wireless network 106, and the third party enterprise 102. In particular, the connectivity process may ensure that the IoT devices 104 are connecting to the wireless network 106 and they are properly exchanging data across the wireless network 106 as well as exchanging data with the third party enterprise 102. In some aspects, the connectivity process ensures that the IoT devices 104 are connecting to multiple wireless carriers and/or multiple wireless networks 106 and they are properly exchanging data across the multiple wireless networks 106 as well as exchanging data with the third party enterprise 102.

In box 406, the internet of things connectivity aggregator process 400 may implement a coding process. The coding process may be implemented by the management API system 152 to ensure proper API coding for implementation of the IoT devices 104 in the wireless network 106 and in conjunction with the third party enterprise 102. In particular, the API coding process ensures the API coding subroutine definitions, protocols, tools, and the like and associated methods of communication between various software components are properly operating. In some aspects, the APIs may include a specification that can take many forms, but may include specifications for routines, data structures, object classes, variables, or remote calls. In some aspects, the API coding process may be implemented by the management API system 152 to ensure proper API coding for implementation of the IoT devices 104 in multiple wireless carriers and/or multiple wireless networks 106 and in conjunction with the third party enterprise 102.

In box 408, the internet of things connectivity aggregator process 400 may implement a billing process that may be implemented by the management API system 152 to ensure proper billing of the wireless services of the IoT devices 104 in the wireless network 106 as well as the billing associated with operation of the functional API system 150. In particular, the billing system 802 may operate to gather billing information from the home PLMN 120, the OCS 124, the PCRF 126, and/or the PDN GW 112 as well as the functional API system 150. In some aspects, the billing system 802 may be implemented by the management API system 152 to ensure proper billing of the wireless services of the IoT devices 104 in multiple wireless carriers and/or multiple wireless networks 106 as well as the billing associated with operation of the functional API system 150.

In box 410, the internet of things connectivity aggregator process 400 may implement a unified policy control process. The unified policy control process may be implemented by the management API system 152 to ensure proper policy and control of the IoT devices 104 in the wireless network 106. In this regard, the unified policy control system 902 may include a policy stored in a database 904. Moreover, the unified policy control process may apply the policy in interactions between the third party enterprise 102, the functional API system 150, and/or the wireless network 106. In particular aspects, the unified policy control process may be implemented by the management API system 152 to ensure proper policy and control of the IoT devices 104 in multiple wireless carriers and/or multiple wireless networks 106.

Figure 5:
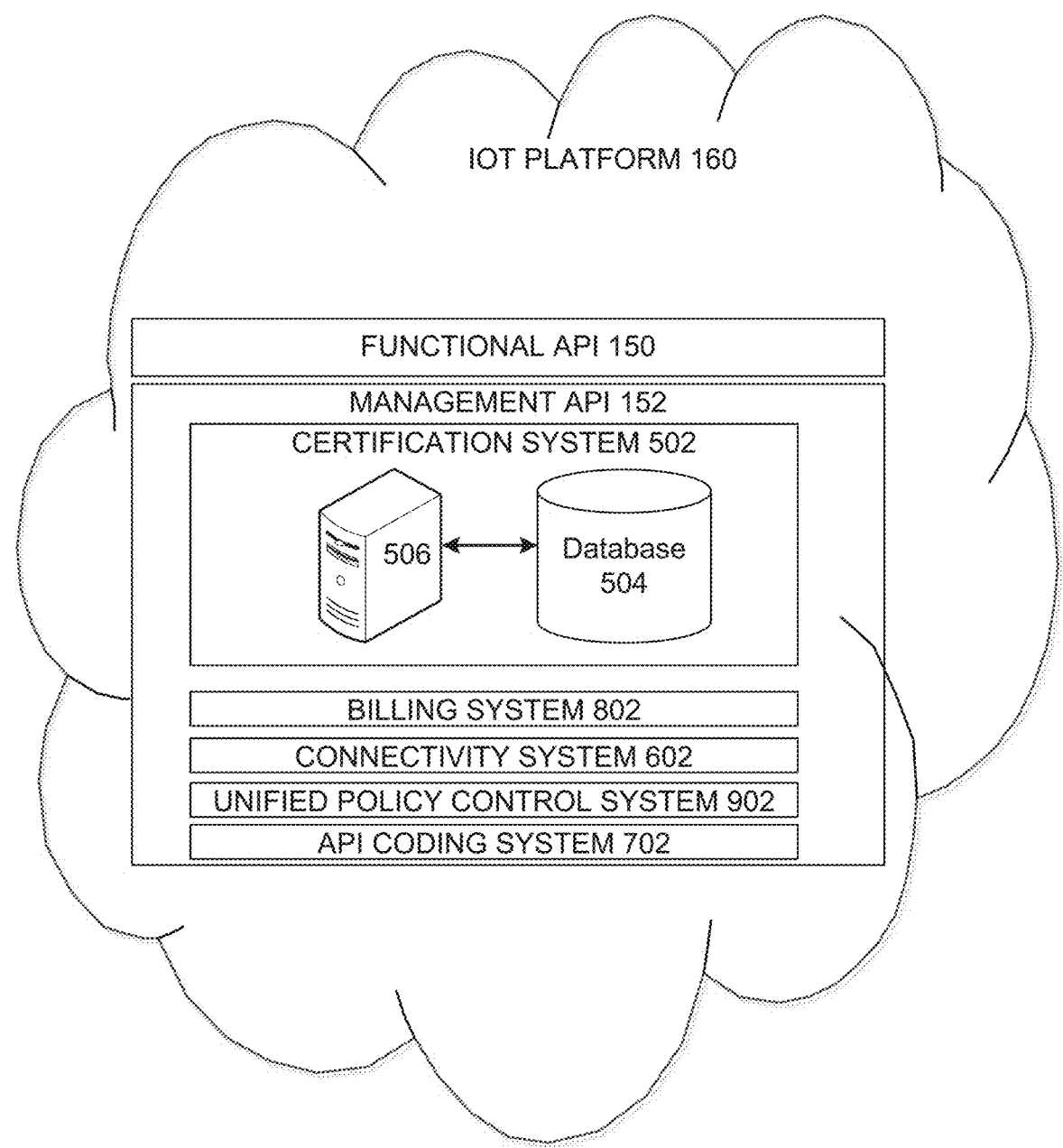
FIG. 5 further illustrates details of an exemplary IoT platform in accordance with aspects of the disclosure.

FIG. 5 further illustrates details of an exemplary IoT platform in accordance with aspects of the disclosure.

In particular, FIG. 5 illustrates the IoT platform 160 together with details of the certification system 502. The certification system 502 may include, connect, implement, and the like the management API system 152, the connectivity system 602, the API coding system 702, the billing system 802, and the unified policy control system 902.

The certification system 502 may be implemented by the management API system 152 to ensure certification of the IoT devices 104 within the wireless network 106. In particular, the certification system 502 may facilitate integration of the IoT devices 104 to their ecosystem. In some aspects, the certification processes ensure the IoT devices 104 are properly integrated (interfaces, data exchange, and logic) and are working with the IoT platform 160. In some aspects, the certification system 502 may be implemented by the management API system 152 to ensure certification of the IoT devices 104 across multiple wireless carriers and/or multiple wireless networks 106 to facilitate integration of the IoT devices 104 to their ecosystem and to ensure proper integration with the multiple wireless carriers and/or the multiple wireless networks 106 with the with the IoT platform 160.

In various aspects, the certification system 502 may include a processor 506. The processor 506 may be implemented as a PC, CPU, server, and the like. The processor 506 may interact with, connect to, and support the management API system 152, the connectivity system 602, the API coding system 702, the billing system 802, and the unified policy control system 902.

In various aspects, the certification system 502 may include a database 504. The database 504 may include digital storage for implementation of the certification system 502. The database 504 may also provide storage for the management API system 152, the connectivity system 602, the API coding system 702, the billing system 802, and the unified policy control system 902.

Figure 6:
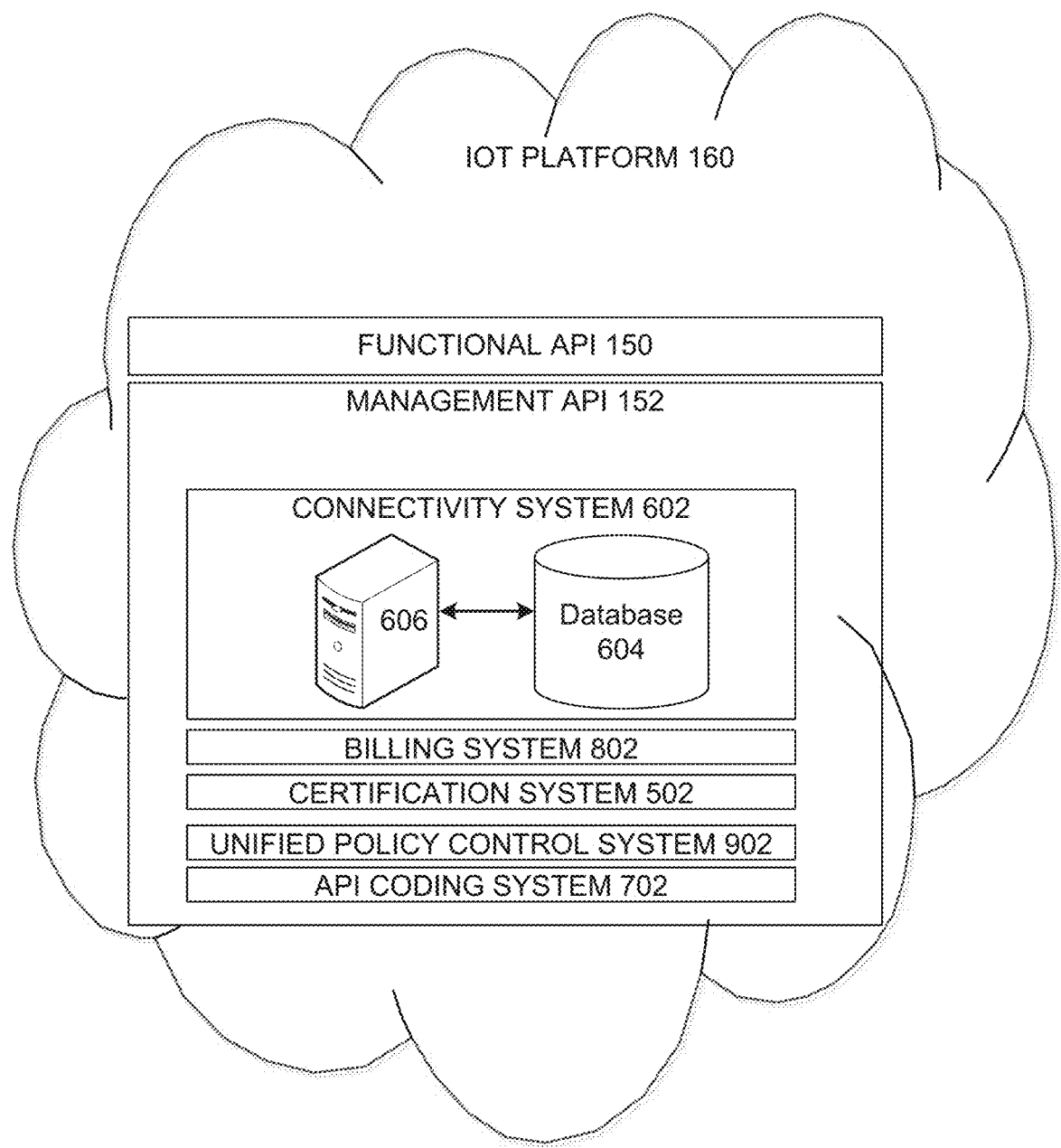
FIG. 6 further illustrates details of an exemplary IoT platform in accordance with aspects of the disclosure.

FIG. 6 further illustrates details of an exemplary IoT platform in accordance with aspects of the disclosure.

In particular, FIG. 6 illustrates the IoT platform 160 together with details of the connectivity system 602. The connectivity system 602 may include, connect, implement, and the like the management API system 152, the certification system 502, the API coding system 702, the billing system 802, and the unified policy control system 902.

The connectivity system 602 may be implemented by the management API system 152 to ensure connectivity between the IoT devices 104, the wireless network 106, and the third party enterprise 102. In particular, the connectivity system 602 ensures that the IoT devices 104 are connecting to the wireless network 106 and they are properly exchanging data across the wireless network 106 as well as exchanging data with the third party enterprise 102. In some aspects, the connectivity system 602 ensures that the IoT devices 104 are connecting to multiple wireless carriers and/or multiple wireless networks 106 and they are properly exchanging data across the multiple wireless networks 106 as well as exchanging data with the third party enterprise 102.

In various aspects, the connectivity system 602 may include a processor 606. The processor 606 may be implemented as a PC, CPU, server, and the like. The processor 606 may interact with, connect to, and support the management API system 152, the certification system 502, the API coding system 702, the billing system 802, and the unified policy control system 902.

In various aspects, the connectivity system 602 may include a database 604. The database 604 may include digital storage for implementation of the connectivity system 602. The database 604 may also provide storage for the management API system 152, the certification system 502, the API coding system 702, the billing system 802, and the unified policy control system 902.

Figure 7:
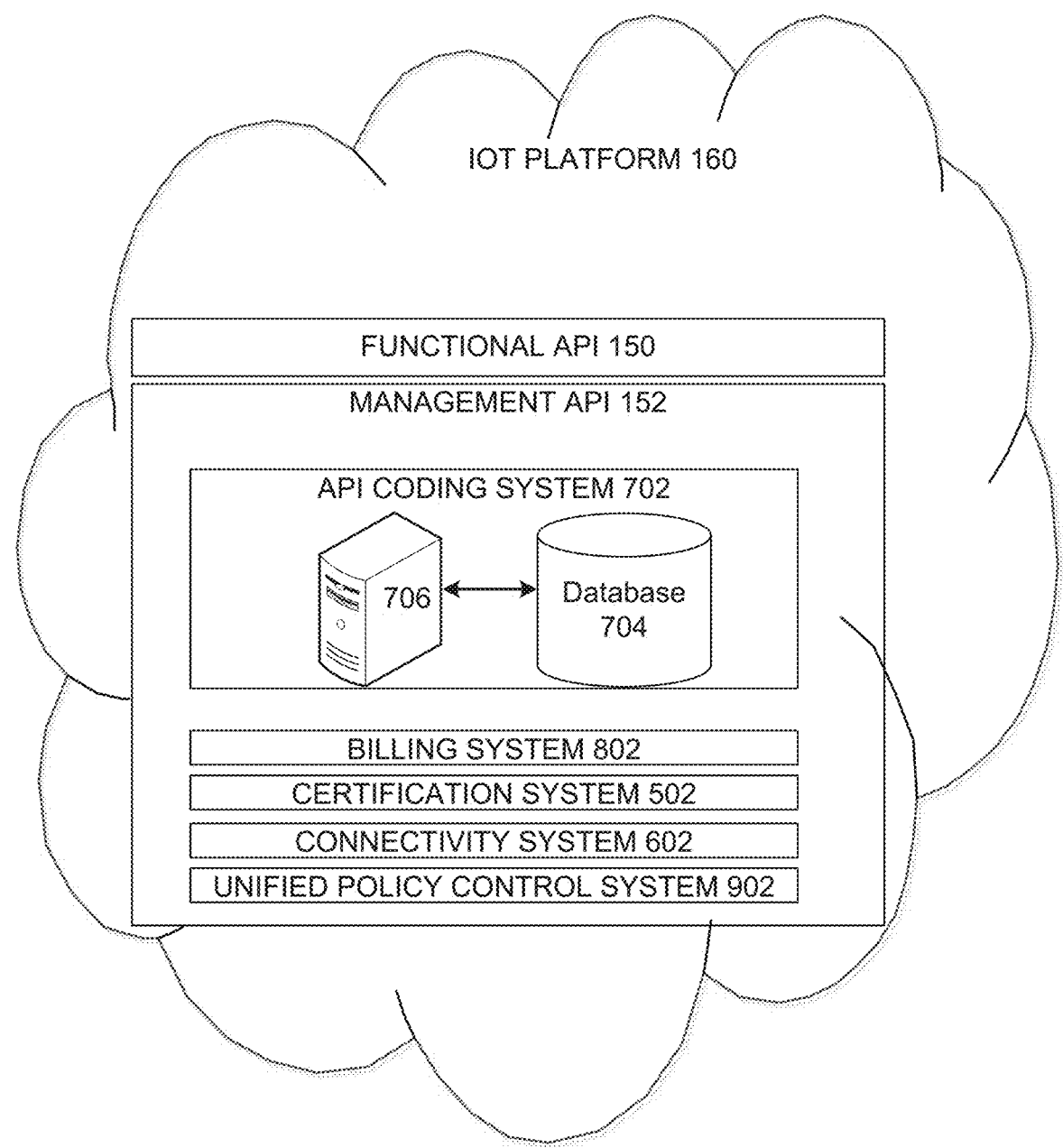
FIG. 7 further illustrates details of an exemplary IoT platform in accordance with aspects of the disclosure.

FIG. 7 further illustrates details of an exemplary IoT platform in accordance with aspects of the disclosure.

In particular, FIG. 7 illustrates the IoT platform 160 together with details of the API coding system 702. The API coding system 702 may include, connect, implement, and the like the management API system 152, the connectivity system 602, certification system 502, the billing system 802, and the unified policy control system 902.

The API coding system 702 may be implemented by the management API system 152 to ensure proper API coding for implementation of the IoT devices 104 in the wireless network 106 and in conjunction with the third party enterprise 102. In particular, the API coding system 702 ensures the API coding subroutine definitions, protocols, tools, and the like and associated methods of communication between various software components are properly operating. In some aspects, the APIs may include a specification that can take many forms, but may include specifications for routines, data structures, object classes, variables, or remote calls. In some aspects, the API coding system 702 may be implemented by the management API system 152 to ensure proper API coding for implementation of the IoT devices 104 in multiple wireless carriers and/or multiple wireless networks 106 and in conjunction with the third party enterprise 102.

In various aspects, the API coding system 702 may include a processor 706. The processor 706 may be implemented as a PC, CPU, server, and the like. The processor 706 may interact with, connect to, and support the management API system 152, the certification system 502, the connectivity system 602, the billing system 802, and the unified policy control system 902.

In various aspects, the API coding system 702 may include a database 704. The database 704 may include digital storage for implementation of the API coding system 702. The database 304 may also provide storage for the management API system 152, the certification system 502, the connectivity system 602, the billing system 802, and the unified policy control system 902.

Figure 8:
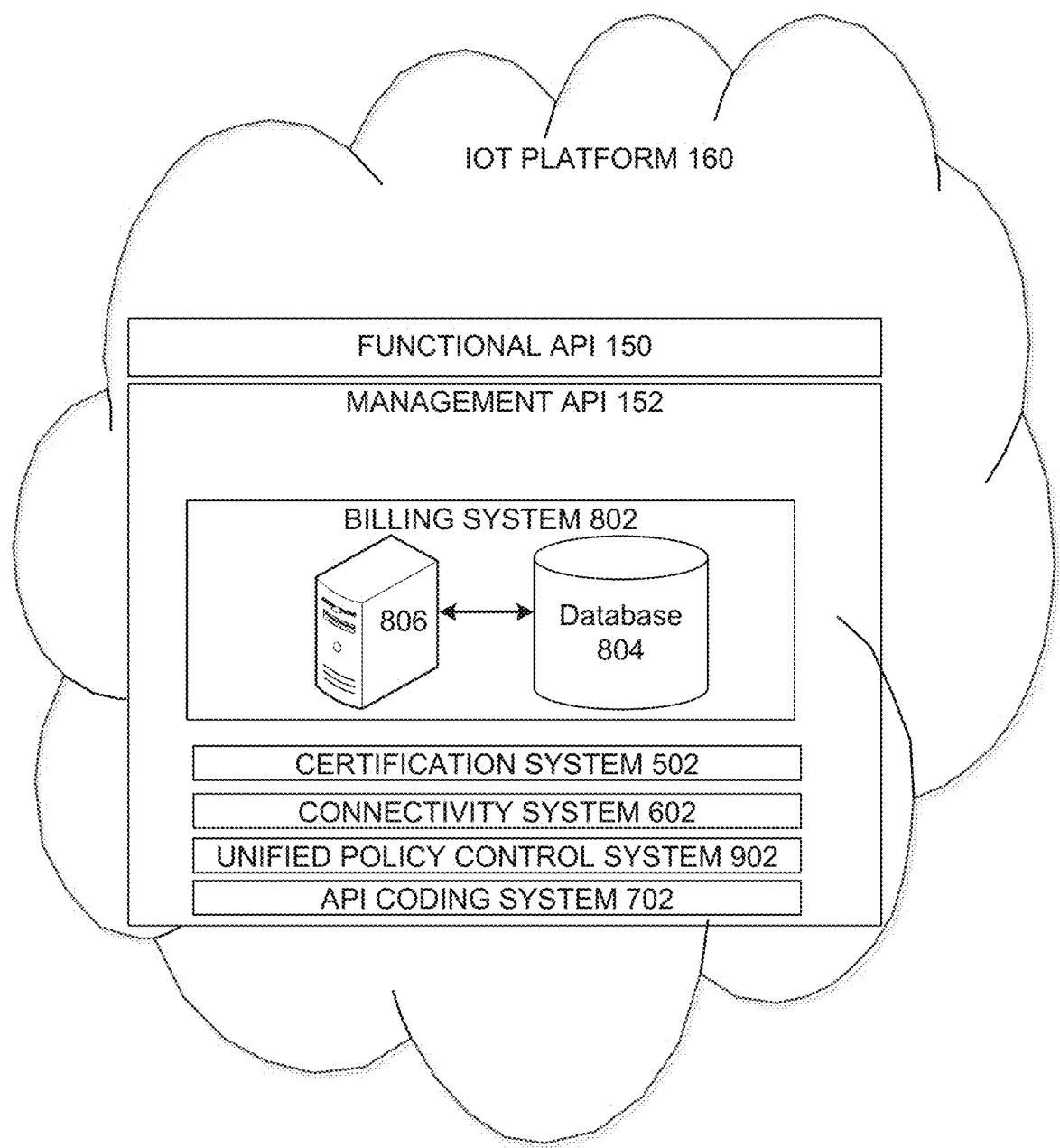
FIG. 8 further illustrates details of an exemplary IoT platform in accordance with aspects of the disclosure.

FIG. 8 further illustrates details of an exemplary IoT platform in accordance with aspects of the disclosure.

In particular, FIG. 8 illustrates the IoT platform 160 together with details of the billing system 802. The billing system 802 may include, connect, implement, and the like the management API system 152, the connectivity system 602, certification system 502, the API coding system 702, and the unified policy control system 902.

The billing system 802 may be implemented by the management API system 152 to ensure proper billing of the wireless services of the IoT devices 104 in the wireless network 106 as well as the billing associated with operation of the functional API system 150. In particular, the billing system 802 may operate to gather billing information from the home PLMN 120, the OCS 124, the PCRF 126, the PDN GW 112 and/or the like as well as the functional API system 150. In some aspects, the billing system 802 may be implemented by the management API system 152 to ensure proper billing of the wireless services of the IoT devices 104 in multiple wireless carriers and/or multiple wireless networks 106 as well as the billing associated with operation of the functional API system 150.

In various aspects, the billing system 802 may include a processor 806. The processor 806 may be implemented as a PC, CPU, server, and the like. The processor 806 may interact with, connect to, and support the management API system 152, the certification system 502, the connectivity system 602, the API coding system 702, and the unified policy control system 902.

In various aspects, the billing system 802 may include a database 804. The database 804 may include digital storage for implementation of the billing system 802. The database 804 may also provide storage for the management API system 152, the certification system 502, the connectivity system 602, the API coding system 702, and the unified policy control system 902.

Figure 9:
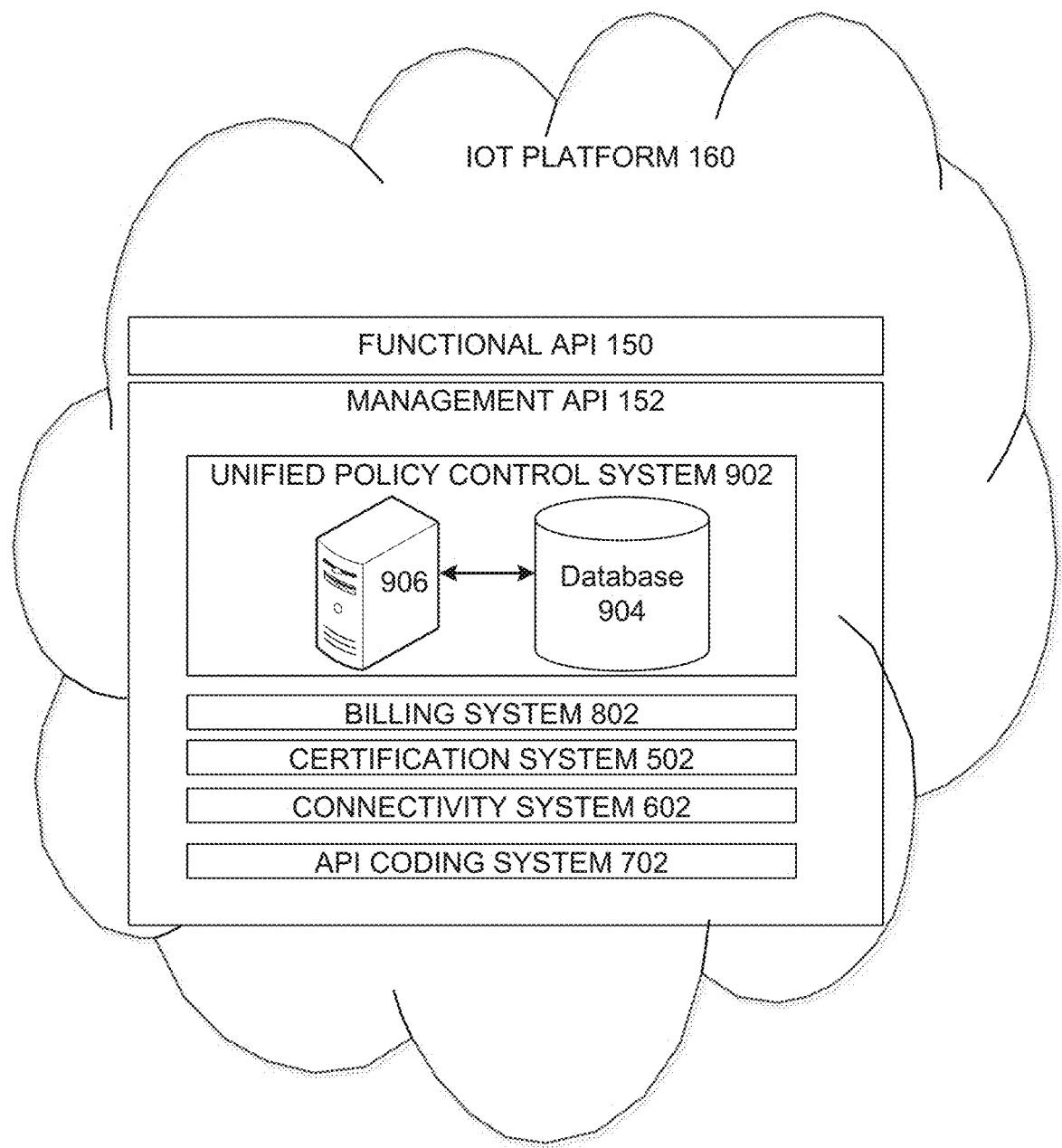
FIG. 9 further illustrates details of an exemplary IoT platform in accordance with aspects of the disclosure.

FIG. 9 further illustrates details of an exemplary IoT platform in accordance with aspects of the disclosure.

In particular, FIG. 9 illustrates the IoT platform 160 together with details of the unified policy control system 902. The unified policy control system 902 may include, connect, implement, and the like the management API system 152, the connectivity system 602, certification system 502, the API coding system 702, and the billing system 802.

The unified policy control system 902 may be implemented by the management API system 152 to ensure proper policy and control of the IoT devices 104 in the wireless network 106. In this regard, the unified policy control system 902 may include a policy stored in a database 904. Moreover, the unified policy control system 902 may apply the policy in interactions between the third party enterprise 102, the functional API system 150, and/or the wireless network 106. In particular aspects, the unified policy control system 902 may be implemented by the management API system 152 to ensure proper policy and control of the IoT devices 104 in multiple wireless carriers and/or multiple wireless networks 106.

In various aspects, the unified policy control system 902 may include a processor 906. The processor 906 may be implemented as a PC, CPU, server, and the like. The processor 906 may interact with, connect to, and support the management API system 152, the certification system 502, the connectivity system 602, the API coding system 702, and the billing system 802.

In various aspects, the unified policy control system 902 may include a database 904. The database 904 may include digital storage for implementation of the unified policy control system 902. The database 904 may also provide storage for the management API system 152, the certification system 502, the connectivity system 602, the API coding system 702, and the billing system 802.

Accordingly, the disclosure has set forth an IoT cloud service 100 that provides increased efficiency, connectivity, control, proficiency, and the like. The IoT cloud service 100 ensures that the third party enterprise 102 has an improved and more reliable experience as it relates to implementation of the various IoT devices 104. Moreover, the disclosure has set forth an IoT cloud service 100 that provides increased efficiency, connectivity, control, proficiency, and the like with respect to multiple wireless carriers and/or multiple wireless networks 106. The IoT cloud service 100 ensures that the third party enterprise 102 has an improved and more reliable experience as it relates to implementation of the various IoT devices 104 with respect to multiple wireless carriers and/or multiple wireless networks 106.

For the purposes of this disclosure a computer readable medium stores computer data, which data can include computer program code that is executable by a processor in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

The IoT control application 252 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™. Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The disclosure includes any and all aspects of the following claims.

The invention claimed is:

1. An internet of things aggregator system comprising:
a processor implemented Internet of things platform configured to connect to and exchange data with multiple wireless carriers, at least one Internet of things device, a functional system, and a third party enterprise;
the processor implemented Internet of things platform configured to implement a certification system, the certification system facilitates integration of the at least one Internet of things device to their ecosystem, and the certification system ensures the at least one Internet of things device is integrated and working;
the processor implemented Internet of things platform further configured to implement a connectivity system, the connectivity system ensures that the at least one Internet of things device is connecting to at least one of the multiple wireless carriers and the at least one Internet of things device is exchanging data across at least one of the multiple wireless carriers as well as exchanging data with the third party enterprise;
the processor implemented Internet of things platform further configured to implement a coding system, the coding system ensures API coding for implementation of the at least one Internet of things device in at least one of the multiple wireless carriers and in conjunction with the third party enterprise, and the coding system ensures API coding of at least subroutine definitions, protocols, tools, and associated methods of communication between various software components by the multiple wireless carriers;

the processor implemented Internet of things platform further configured to implement a billing system, the billing system being configured to gather billing information from the multiple wireless carriers and the functional system and ensure billing of wireless services of the at least one Internet of things device in the multiple wireless carriers as well as a billing associated with operation of the functional system; and the processor implemented Internet of things platform further configured to implement a unified policy control system, the unified policy control system comprises a policy stored in a database, and the unified policy control system applies the policy stored in the database in interactions between the third party enterprise, the functional system, and the multiple wireless carriers, wherein the data comprises at least data, information, and instructions;

wherein the processor implemented Internet of things platform and the functional system are configured to connect to and exchange all data between the at least one Internet of things device and the third party enterprise; and wherein the functional system is configured to run commands for the at least one Internet of things device and configured to build applications for the at least one Internet of things device to send and receive messages.

2. The internet of things aggregator system according to claim 1 wherein the certification system ensures certification of the at least one Internet of things device across the multiple wireless carriers.

3. The internet of things aggregator system according to claim 1 wherein the connectivity system ensures that the at least one Internet of things device is connecting to at least one of the multiple wireless carriers and the at least one Internet of things device is exchanging data across at least one of the multiple wireless carriers as well as exchanging data with the third party enterprise.

4. The internet of things aggregator system according to claim 1 wherein the coding system ensures API coding for implementation of the at least one Internet of things device in at least one of the multiple wireless carriers and in conjunction with the third party enterprise.

5. The internet of things aggregator system according to claim 1 wherein each of the multiple wireless carriers implements a home public land mobile network, an online charging system, a policy and charging rules function, and a public data network gateway;

wherein the billing system receives billing information from at least one of the home public land mobile network, the online charging system, the policy and charging rules function, and the public data network gateway of each of the multiple wireless carriers; and wherein the billing system receives billing information from the functional system.

6. The internet of things aggregator system according to claim 5 wherein the billing system is configured to ensure billing of wireless services for the multiple wireless carriers for the at least one Internet of things device based on the billing information received from at least one of the home public land mobile network, the online charging system, the policy and charging rules function, and the public data network gateway of each of the multiple wireless carriers.

7. The internet of things aggregator system according to claim 1 wherein the unified policy control system applies the policy in interactions between the third party enterprise, the functional system, and the multiple wireless carriers; and wherein the unified policy control system includes a database configured to store the policy.

8. The internet of things aggregator system according to claim 1 wherein the at least one Internet of things device comprises a transceiver configured to transmit and receive data from one of the multiple wireless carriers.

9. The internet of things aggregator system according to claim 1 wherein:

the certification system ensures certification of the at least one Internet of things device across the multiple wireless carriers;

the connectivity system ensures that the at least one Internet of things device is connecting to at least one of the multiple wireless carriers and the at least one Internet of things device is exchanging data across at least one of the multiple wireless carriers as well as exchanging data with the third party enterprise;

the coding system ensures API coding for implementation of the at least one Internet of things device in at least one of the multiple wireless carriers and in conjunction with the third party enterprise;

wherein each of the multiple wireless carriers implements a home public land mobile network, an online charging system, a policy and charging rules function, and a public data network gateway;

wherein the billing system receives billing information from at least one of the home public land mobile network, the online charging system, the policy and charging rules function, and the public data network gateway of each of the multiple wireless carriers; and wherein the billing system receives billing information from the functional system;

wherein the billing system is configured to ensure billing of wireless services for the multiple wireless carriers for the at least one Internet of things device based on the billing information received from at least one of the home public land mobile network, the online charging system, the policy and charging rules function, and the public data network gateway of each of the multiple wireless carriers.

10. An internet of things aggregator system comprising:

a processor implemented Internet of things platform configured to connect to and exchange data with multiple wireless carriers, at least one Internet of things device, a functional system, and a third party enterprise;

the processor implemented Internet of things platform configured to implement a certification system, the certification system facilitates integration of the at least one Internet of things device to their ecosystem, and the certification system ensures the at least one Internet of things device is integrated and working;

the processor implemented Internet of things platform further configured to implement a connectivity system, the connectivity system ensures that the at least one Internet of things device is connecting to at least one of the multiple wireless carriers and the at least one Internet of things device is exchanging data across at least one of the multiple wireless carriers as well as exchanging data with the third party enterprise;

the processor implemented Internet of things platform further configured to implement a coding system, the coding system ensures API coding for implementation of the at least one Internet of things device in at least one of the multiple wireless carriers and in conjunction with the third party enterprise, and the coding system ensures API coding of at least subroutine definitions, protocols, tools, and associated methods of communication between various software components;

the processor implemented Internet of things platform further configured to implement a billing system, the billing system ensures billing of wireless services of the at least one Internet of things device in the multiple wireless carriers as well as a billing associated with operation of the functional system; and the processor implemented Internet of things platform further configured to implement a unified policy control system, the unified policy control system comprises a policy stored in a database, and the unified policy control system applies the policy in interactions between the third party enterprise, the functional system, and the multiple wireless carriers, wherein the data comprises at least data, information, and instructions;

wherein the certification system ensures certification of the at least one Internet of things device across at least one of the multiple wireless carriers;

wherein the connectivity system ensures that the at least one Internet of things device is connecting to at least one of the multiple wireless carriers and the at least one Internet of things device is exchanging data across at least one of the multiple wireless carriers as well as exchanging data with the third party enterprise;

wherein the coding system ensures API coding for implementation of the at least one Internet of things device in the multiple wireless carriers and in conjunction with the third party enterprise;

wherein each of the multiple wireless carriers implements a home public land mobile network, an online charging system, a policy and charging rules function, and a public data network gateway;

wherein the billing system receives billing information from at least one of the home public land mobile network, the online charging system, the policy and charging rules function, and the public data network gateway of each of the multiple wireless carriers;

wherein the billing system receives billing information from the functional system;

wherein the billing system is configured to ensure billing of wireless services for the multiple wireless carriers for the at least one Internet of things device based on the billing information received from at least one of the home public land mobile network, the online charging system, the policy and charging rules function, and the public data network gateway of each of the multiple wireless carriers;

wherein the unified policy control system applies the policy in interactions between the third party enterprise, the functional system, and the multiple wireless carriers; and wherein the at least one Internet of things device comprises a transceiver configured to transmit and receive data from one of the multiple wireless carriers.

11. An internet of things aggregator process comprising:
implementing a processor implemented Internet of things platform configured to connect to and exchange data with multiple wireless carriers, at least one Internet of things device, a functional system, and a third party enterprise;

implementing a certification process with the processor implemented Internet of things platform, the certification process facilitates integration of the at least one Internet of things device to their ecosystem, and the certification process ensures the at least one Internet of things device is integrated and working;

implementing a connectivity process with the processor implemented Internet of things platform, the connectivity process ensures that the at least one Internet of things device is connecting to at least one of the multiple wireless carriers and the at least one Internet of things device is exchanging data across at least one of the multiple wireless carriers as well as exchanging data with the third party enterprise;

implementing a coding process with the processor implemented Internet of things platform, the coding process ensures API coding for implementation of the at least one Internet of things device in at least one of the multiple wireless carriers and in conjunction with the third party enterprise, and the coding process ensures API coding of at least subroutine definitions, protocols, tools, and associated methods of communication between various software components by the multiple wireless carriers;

implementing a billing process with the processor implemented Internet of things platform, the billing process gathering billing information from the multiple wireless carriers and the functional system and ensuring billing of wireless services of the at least one Internet of things device in at least one of the multiple wireless carriers as well as the billing associated with operation of the functional system; and implementing a unified policy control process with the processor implemented Internet of things platform, the unified policy control process comprises a policy stored in a database, and the unified policy control process applies the policy stored in the database in interactions between the third party enterprise, the functional system, and the multiple wireless carriers, wherein the data comprises at least data, information, and instructions;

wherein the processor implemented Internet of things platform and the functional system are configured to connect to and exchange all data between the at least one Internet of things device and the third party enterprise; and wherein the functional system is configured to run commands for the at least one Internet of things device and configured to build applications for the at least one Internet of things device to send and receive messages.

12. The internet of things aggregator process according to claim 11 wherein the certification process ensures certification of the at least one Internet of things device across the multiple wireless carriers.

13. The internet of things aggregator process according to claim 11 wherein the connectivity process ensures that the at least one Internet of things device is connecting to at least one of the multiple wireless carriers and the at least one Internet of things device is exchanging data across at least one of the multiple wireless carriers as well as exchanging data with the third party enterprise.

14. The internet of things aggregator process according to claim 11 wherein the coding process ensures API coding for implementation of the at least one Internet of things device in at least one of the multiple wireless carriers and in conjunction with the third party enterprise.

15. The internet of things aggregator process according to claim 11
wherein each of the multiple wireless carriers implements a home public land mobile network, an online charging system, a policy and charging rules function, and a public data network gateway;
wherein the billing process receives information from at least one of the home public land mobile network, the online charging system, the policy and charging rules function, and the public data network gateway of each of the multiple wireless carriers; and
wherein the billing process receives billing information from the functional system.

16. The internet of things aggregator process according to claim 15 wherein the billing process ensures billing of wireless services for the multiple wireless carriers for the at least one Internet of things device based on the billing information received from at least one of the home public land mobile network, the online charging system, the policy and charging rules function, and the public data network gateway of each of the multiple wireless carriers.

17. The internet of things aggregator process according to claim 11
wherein the unified policy control process applies the policy in interactions between the third party enterprise, the functional system, and the multiple wireless carriers; and
wherein the unified policy control process implements a database configured to store the policy.

18. The internet of things aggregator process according to claim 11 wherein the at least one Internet of things device comprises a transceiver configured to transmit and receive data from one of the multiple wireless carriers.

19. The internet of things aggregator process according to claim 11
wherein the certification process ensures certification of the at least one Internet of things device across at least one of the multiple wireless carriers;
wherein the connectivity process ensures that the at least one Internet of things device is connecting to the multiple wireless carriers and the at least one Internet of things device is exchanging data across at least one of the multiple wireless carriers as well as exchanging data with the third party enterprise;
wherein the coding process ensures API coding for implementation of the at least one Internet of things device in at least one of the multiple wireless carriers and in conjunction with the third party enterprise;
wherein each of the multiple wireless carriers implements a home public land mobile network, an online charging system, a policy and charging rules function, and a public data network gateway;
wherein the billing process receives information from at least one of the home public land mobile network, the online charging system, the policy and charging rules function, and the public data network gateway of each of the multiple wireless carriers;
wherein the billing process receives billing information from the functional system;
wherein the unified policy control process applies the policy in interactions between the third party enterprise, the functional system, and the multiple wireless carriers; and
wherein the at least one Internet of things device comprises a transceiver configured to transmit and receive data from one of the multiple wireless carriers.

20. The internet of things aggregator process according to claim 11 wherein:
the connectivity process ensures that the at least one Internet of things device is connecting to at least one of the multiple wireless carriers and the at least one Internet of things device is exchanging data across the multiple wireless carriers as well as exchanging data with the third party enterprise;
the coding process ensures API coding for implementation of the at least one Internet of things device in at least one of the multiple wireless carriers and in conjunction with the third party enterprise; and
wherein each of the multiple wireless carriers implements a home public land mobile network, an online charging system, a policy and charging rules function, and a public data network gateway;
wherein the billing process receives information from at least one of the home public land mobile network, the online charging system, the policy and charging rules function, and the public data network gateway of each of the multiple wireless carriers; and
wherein the billing process receives billing information from the functional system.

\* \* \* \* \*